June 22, 1965 D. R. YOUNG 3,191,159

SUPERCONDUCTOR CIRCUIT

Filed Dec. 22, 1959 3 Sheets-Sheet 1

INVENTOR
DONALD R. YOUNG

BY John E. Dougherty Jr.
ATTORNEY

June 22, 1965 D. R. YOUNG 3,191,159

SUPERCONDUCTOR CIRCUIT

Filed Dec. 22, 1959 3 Sheets-Sheet 2

United States Patent Office 3,191,159
Patented June 22, 1965

3,191,159

SUPERCONDUCTOR CIRCUIT

Donald R. Young, Poughkeepsie, N.Y., assignor to International Business Machines Corporation, New York, N.Y., a corporation of New York Filed Dec. 22, 1959, Ser. No. 861,392
14 Claims. (Cl. 340—173.1)

The present invention relates to superconductor circuits and, more particularly, to superconductor circuits including one or more superconductive loops in which persistent currents are stored and to which current signals are thereafter applied to obtain outputs indicative of either the value of the stored persistent current, the value of the current applied to the loop, or the relationship between the values represented by the stored persistent current and the current applied to the loop.

The state of the superconductor art has advanced rapidly in the last few years, particularly in the field of component and circuits useable in data processing systems. The principal switching component thus far proposed for use in such circuits is a device which has been lately termed a cryotron, and which includes a superconductor gate conductor and a superconductor control conductor arranged in magnetic field applying relationship to the gate conductor for controlling the state of the gate conductor between superconductive and resistive states. Examples of various circuits using this type switching device may be found in U.S. Patent 2,832,897, issued April 29, 1958, to D. A. Buck. Examples of superconductor circuits employing cryotrons as well as superconductive loops in which persistent currents are selectively stored, may be found in copending application Serial No. 781,749, now U.S. Patent No. 3,086,197, filed December 19, 1958, in behalf of J. L. Anderson, and assigned to the assignee of the subject application. Though superconductor circuits have been developed for many computer functions, as exemplified by the patent and application cited above, there has been no significant effort in developing what may be generally termed current comparison circuits and it is to this end that the invention of the subject application is directed.

In accordance with the principles of this invention, improved current comparison circuits are provided which employ a loop of superconductor material in which a persistent current is stored. The loop is formed of two current paths which extend in parallel between first and second current terminals for the loop. The control conductor of an output cryotron for the loop is connected in one of these current paths. The comparison operations are performed by applying a current to one of the terminals for the loop after a persistent current has been stored in the loop. The applied current divides between the two paths with the applied current flowing in the same direction as the persistent current in one path and in an opposite direction to the persistent current in the other path. The control conductor of the output cryotron is connected in this latter path. The net current in this control conductor is zero when the magnitude of the applied current bears a specific relationship to the magnitude of the current stored in the loop. Circuit operations may be performed in which the persistent current stored in the loop is representative of a known current value and the applied current is the unknown, or conversely, the persistent current may represent the unknown value and the applied current the known value. The characteristic of the output cryotron is such that the gate of this cryotron is driven resistive by small amounts of current in either direction in its control conductor. The circuit, therefore, functions as a true level discriminator in that the gate of the output cryotron is superconductive only when the portion of the applied current in the control conductor is substantially equal to the stored current, and is resistive when the portion of the applied current is either greater than or less than the stored current. The sensitivity of the circuit may be varied by varying the inductance values of the two paths forming the loop. The sensitivity is higher when the inductance of the path in which the control conductor is connected is appreciably less than the inductance of the other path. The sensitivity may also be varied by changing the design of the cryotrons themselves and/or the magnitude of the current applied to the gate of the output cryotron.

The comparison circuits, as above described, may also be provided with two further output cryotrons having their control conductors connected in the same path of the superconductive loop as is the control conductor of the output cryotron described above. By applying biasing magnetic fields in opposite directions to these two further output cryotrons and connecting the gates of the three output cryotrons in appropriate output circuits, distinct current outputs through one of these gates, exclusively, are realized to indicate whether an applied current is higher than, equal to, or lower than the value represented by the persistent current stored in the loop.

Further, as is illustrated in another embodiment of the invention, the comparison circuit described above may be used as an analog to digital converter. The complete converter includes a plurality of superconductive loops in each of which is stored a different value of persistent current. Analog currents are applied to the loops and the output cryotron for each loop is in the superconductive state only when the analog current matches, within predetermined limits, the value represented by the current stored in that loop. The gate conductors of the output cryotrons for the loops are connected in an output circuit for the converter so that, for each value of analog input current, an output current is directed through the proper one of these gate conductors to provide a distinct digital output representation.

The object of the present invention is to provide improved superconductor comparison circuits.

Another object is to provide a superconductor circuit which functions as a true current level discriminator.

A more specific object is to provide a superconductor comparison circuit capable of providing a distinct output indicative of a comparison between two current values.

A further object is to provide a circuit of the above described type which is extremely sensitive and which distinguishes actual comparisons from cases where one of the currents is either slightly higher or slightly lower than the other current.

Still a further object is to provide a superconductor circuit capable of comparing two current values and of providing distinct current outputs indicative of whether one value is higher than, equal to, or lower than the other value.

A further object is to provide an improved analog to digital converter and, more specifically, an analog to digital converter capable of providing a distinct current output on the proper one of a number of digital output lines in response to each value of analog current applied to the circuit.

Still another object is to provide a circuit of the above described type employing currents which are established in superconductive loops and which, once established, persist without the application of further electrical energy.

The foregoing and other objects, features and advantages of the invention will be apparent from the following more particular description of the preferred embodiments of the invention, as illustrated in the accompanying drawings.

Figures 1, 2, 3, 3A:
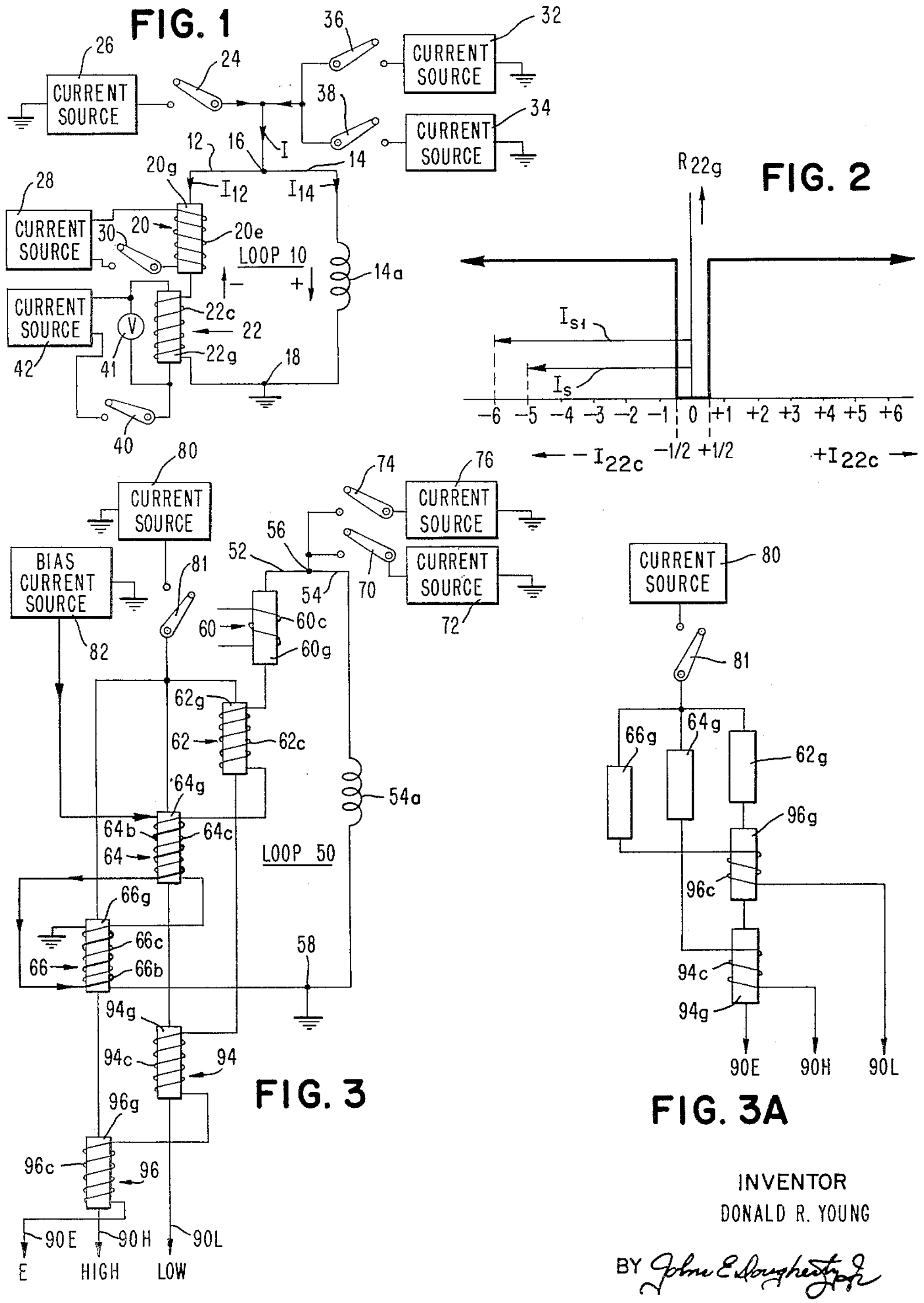
FIG. 1 is a schematic representation of a current comparison circuit.
FIG. 2 shows the characteristic of the output cryotron of the circuit of FIG. 1.

FIGS. 3 and 3A diagrammatically represent further embodiments of current comparison circuits.

Figure 4A:
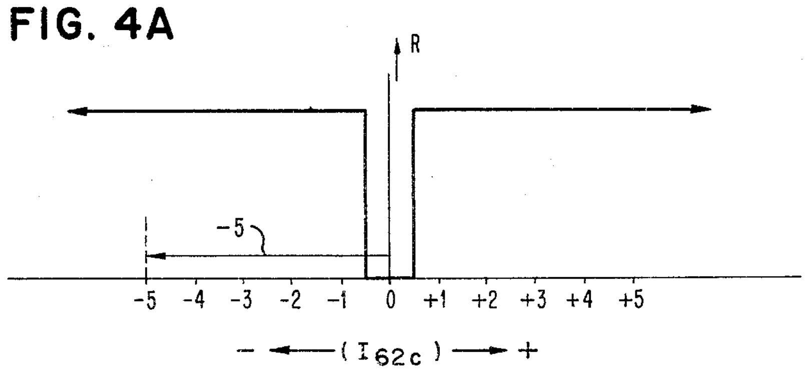
Figure 4B:
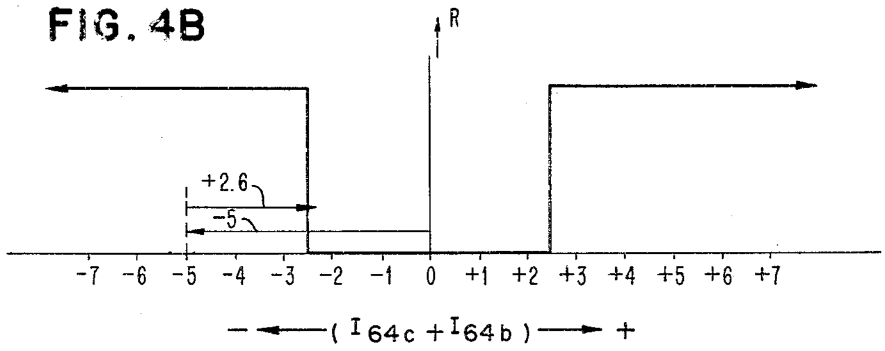
Figure 4C:
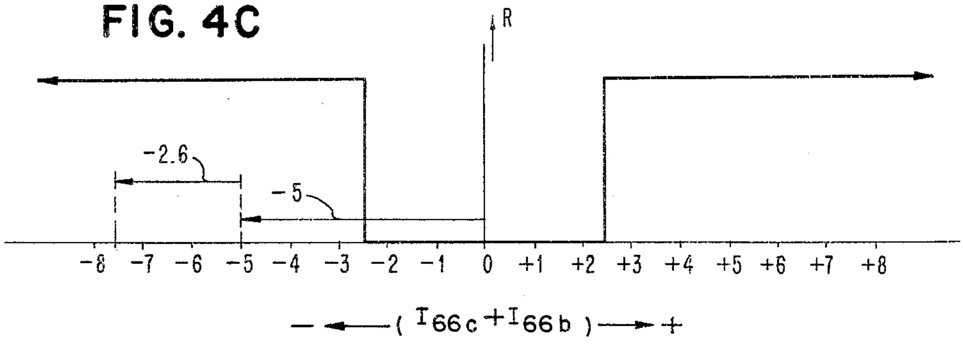

FIGS. 4A, 4B, and 4C are plots of the characteristics of the three output cryotrons for the circuits of FIGS. 3 and 3A.

Figure 5:
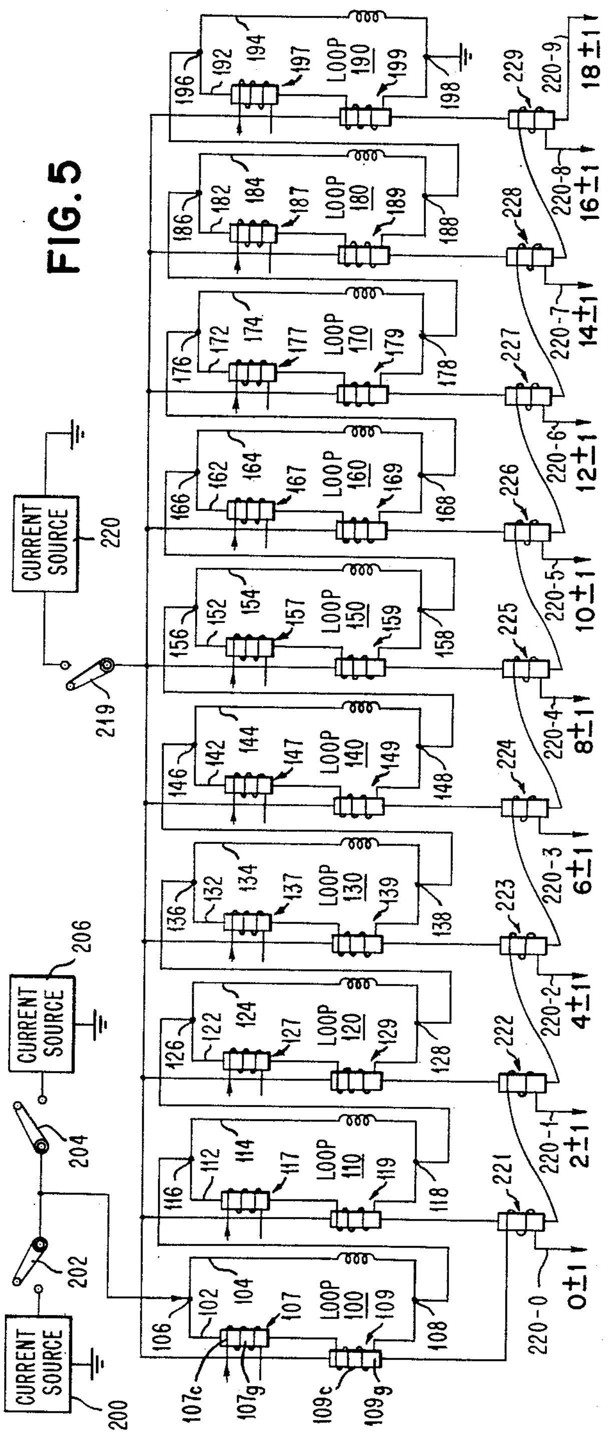

FIG. 5 is a schematic representation of an analog to digital converter circuit.

Figure 6:
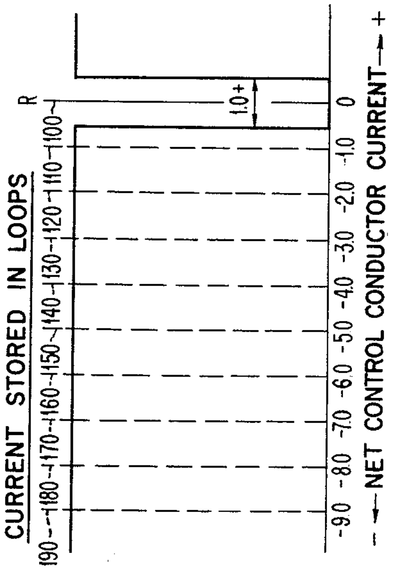

FIG. 6 is a plot of the characteristics of the output cryotrons employed in the circuit of FIG. 5 and shows the different values of persistent current stored in the superconductive loops employed in this circuit.

Figure 7:
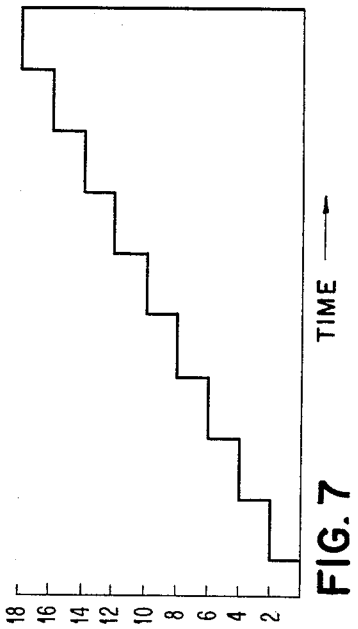

FIG. 7 is a plot showing the wave form of the current signal initially applied to the loops of FIG. 5 to store different values of currents in these loops.

FIG. 1 is a diagrammatic representation of a current comparision circuit embodying applicant's invention. The circuit includes a closed loop of superconductive material designated 10 which is formed by two current paths 12 and 14 extending in parallel from a current input terminal 16 to a ground or reference terminal 18. Current path 12 includes the gate conductor **20*g* of a cryotron 20 and the control conductor 22*c* of a cryotron 22. The cryotrons 20 and 22** are represented as wire wound cryotrons in the interest of providing a graphic illustration of the circuit. However, these cryotrons, as well as the remaining portions of the circuit, are preferably fabricated in thin film form. For details of operation and fabrication of thin film cryotron circuits reference may be made to copending applications Serial No. 625,512 and Serial No. 765,760, now U.S. Patent No. 3,047,230 filed November 30, 1956 and October 7, 1958, respectively, and assigned to the assignee of the subject invention.

The circuit of FIG. 1 is operated as a compare circuit by first applying a current at input terminal 16, which current may, for example, be a current of known magnitude. This first applied current is directed into path 14 by introducing resistance in path 12. Path 12 is then allowed to become superconductive and the applied current is terminated thereby producing a stored or persistent current in loop 10. The magnitude of the stored current is related to the magnitude of the applied current. Thereafter, further current signals are applied to terminal 16 and, through the agency of cryotron 22 which is an output cryotron, an indication is provided as to whether or not the newly applied current signals are equal to the originally applied current, or more generally, whether the value of these signals bear a specific relationship to the value represented by the current stored in loop 10. An important function of applicant's invention, as embodied by the circuit of this figure, is that it provides an output indicative of a comparison only when a true comparison is achieved. The circuit provides an output indicative of no comparison when the applied current signal is either smaller or larger in magnitude than the signal used to store the persistent current.

Considering the circuit in more detail, a current is initially stored in loop 10 in the following manner. A switch 24 is closed to allow a current source 26 apply a current at terminal 16. At this time, the loop 10 is entirely superconductive so that the applied current divides between paths 12 and 14 inversely in proportion to the inductances of these paths. If, for the present example, it is assumed that the current applied by source 26 is a known current of 10 units and for ease of illustration at this point, that the inductance of path 12, designated $L_{12}$, is equal to the inductance of path 14, designated $L_{14}$, the applied current divides equally between paths 12 and 14. After the current has been applied to terminal 16, the control conductor **20*c* of cryotron 20 is energized by current supplied by a pulse source 28 under control of a switch 30 to thereby drive gate 20*g* resistive. This gate is maintained resistive for a time sufficient to cause the 5 units of current flowing in path 12 to be shifted to path 14 so that the entire 10 units of current from source 26 are flowing in path 14. Incident to this current shifting operation, the presence of the resistive gate 20*g* in loop 10 ensures that any persistent current previously stored in loop 10** is quenched.

After the entire applied current has been established in path 14, the pulse on control conductor **20*e* is terminated to allow the gate 20*g* to again assume a superconductive state. Since path 14 remains entirely superconductive, the entire applied current remains in this path. At this time, the applied current is terminated by opening switch 24. However, with the entire source current flowing in path 14, there is a net flux threading loop 10. Since it is not possible to change a net flux threading a superconductive loop, a persistent current is established in the loop when the applied current is terminated. Where, as here, the inductance values of the paths 12 and 14 are equal, the magnitude of the stored persistent current is equal to one half the originally applied current. The stored persistent current flows in a clockwise direction, that is, down in path 14 and up in path 12**. The equation for computing the amount of persistent current stored as the result of an operation such as above described is as follows:

$$I_S = I_A \frac{L_{14}}{L_{12}+L_{14}}$$

where $I_S$=the magnitude of the stored current;
$I_A$=the magnitude of the applied current;
$L_{14}$=the inductance of path 14; and
$L_{12}$=the inductance of path 12.

The manner in which the persistent current is stored in loop 10 and the magnitude of this current actually stored may be more simply illustrated by considering the currents in the loop to be a superposition of loop currents and applied currents. Thus, when the entire current of 10 units from source 26 is established in path 14, the net current may be considered to be the superposition of a loop current of 5 units flowing in a clockwise direction around the loop with the applied current of 10 divided between paths 12 and 14 inversely in proportion to the inductance of these paths, that is, with 5 units in each path. When the applied current of 10 units is removed by operating switch 24, the 5 units of applied current are removed from each of the equal inductance paths, leaving the 5 units of loop current flowing in the clockwise direction as a persistent current in the loop.

Once the persistent current has been established in loop 10, comparison operations may be initiated. Unknown currents of any magnitude less than that which will, of itself, or in combination with the stored current cause a portion of the loop 10 to be driven resistive, are applied to terminal 16. In FIG. 1 these unknown currents are supplied by current sources 32 and 34 under control of switches 36 and 38. Two such current sources are shown to illustrate that the current from any one of a large number of sources, each of which may be producing varying current, may be selectively compared with that stored in loop 10. When either switch 36 or 38 is operated to apply the current of source 32 or 34 to terminal 16, the applied current divides between paths 12 and 14 inversely in proportion to the inductances of these paths. With the inductances equal, the applied current splits evenly between the paths. The total current in path 12 and, therefore, in the control conductor 22*c* of cryotron 22 is made up of the combination of the 5 units of current flowing up through this cryotron control conductor and one half of the current applied at terminal 16. As indicated in FIG. 1, the direction of the currents applied by sources 32 and 34 to paths 12 and 14 is in the downward direction, that is, in the same direction as the current originally applied by source 26. The portion of the applied current directed through path 12 is opposite to that of the stored current in this path and the net current in control conductor 12 is, therefore, equal to the difference between these currents.

The characteristic for output cryotron 22 is shown in FIG. 2, in which the resistance of the cryotron gate 22*g* is plotted against the net current in the control conductor 22*c*. In this plot, current in the upward direction through control conductor 22*c* is plotted as negative and in the downward direction as positive. The plot shows that net currents of ½ unit and greater, whether plus or minus, are effective to drive the gate 22*g* resistive. When the net current in control conductor 22*c* is less than ½ unit in either direction, that is between +½ and −½, the gate is in a superconductive state. The plot of FIG. 2 does not show the effect of the current applied to the gate conductor 22*g*. This current alters the value of current required in the control conductor 22*c* to drive the gate resistive in a manner considered in detail below. For the present, the effect of current in the gate 22*g* on the operating characteristic of cryotron 22 is not considered.

The value of the 5 units of current stored in the clockwise direction of loop 10 results in a flow of 5 units of current in an upward direction in control conductor 22*c*. This value is represented by the arrow $I_S$ in FIG. 2. The current applied in the down direction to path 12 including control conductor 22*g* causes the net current in the control conductor 22*c* to move from right to left as viewed in FIG. 2. The net current in control conductor 22*c* for different values of applied current are shown in tabular form below, it being noted that the applied current divides equally between paths 12 and 14.

| I stored | I applied at terminal 16 | I net in control conductor 22c |
|---|---|---|
| −5 | +6 | −2 |
| −5 | +8 | −1 |
| −5 | +9 | −½ |
| −5 | +10 | −0 |
| −5 | +11 | +½ |
| −5 | +12 | +1 |

From this table it can be seen that where the applied current is greater than 9 units and less than 11 units the gate 22*g* is superconductive. For all other values of applied current the gate 22*g* is resistive. Since the original current applied by source 26 to store the current in loop 10 was 10 units, an unknown applied current produces a comparison, manifested by the superconductive state of gate 22*g*, when the applied unknown current is within 10% of the originally stored current. The output of the circuit of FIG. 1 is manifested by a voltmeter 41 which is connected across gate 22*g*. The state of gate 22*g* is sensed by operating a switch 40 to allow a pulse source 42 to apply a current pulse to gate 22*g*. The switch is operated after the current to be compared has been applied at terminal 16 by operating switch 36 or switch 38. If, when switch 40 is operated, gate 22*g* is resistive, voltmeter 41 deflects to indicate that the applied current is either greater than or less than 10 units within the tolerances above mentioned. If gate 22*g* is superconductive, no output voltage is sensed indicating a comparison.

The sensitivity of the circuit of FIG. 1 may be improved in a number of ways. For example, the circuit may be designed so that the inductance of path 14 is appreciably greater than that of path 12; the limit is reached when the inductance of path 14 is so large compared to the inductance of path 12 that the magnitude of the stored current is substantially equal to the current initially applied during the setting up of the circuit for operation, and the currents subsequently applied during comparison operations are directed almost entirely through the low inductance path 12. Further, the magnitude of the sensing current supplied by source 42 may be increased. Finally, the sensitivity of the output cryotron, itself, may be increased.

The effect of designing the circuit so that the inductance of path 14 is greater than that of path 12 is considered with respect to FIGS. 1 and 2. In FIG. 1, the inductance $L_{14}$ is represented schematically by the coil 14*a*. Actually, the inductance of this path includes the inductance of the conductors forming the path. Similarly, the inductance $L_{12}$ of path 12 includes the inductance of the conductors forming the path. When the circuit is fabricated in thin film form and laid down on a superconductor shield, the control conductor 22*c* is in the form of a narrow portion of superconductor material which traverses gate 22*g*. Since the inductances of the conductors forming such a thin film circuit varies directly with the length of the conductors and inversely with their width, the path 14 may be made to exhibit a high inductance by making it long or by fabricating it of narrow film conductors. Further, when using thin film type shielded circuits, a large relative inductance may be introduced in path 14 by providing an opening in the superconductive shield adjacent a portion of this path. Similar procedures are used in designing a wire wound circuit with path 14 having a high inductance or as indicated in FIG. 1, if the paths are of equal length, a coil such as 14*a*, having a higher inductance than that of control conductor 22*c* is connected in path 14.

The operation of the circuit of FIG. 1 is now considered for the case where the inductance of path 14 is one and one half that of path 12, that is, wherein $L_{14}=1\frac{1}{2}L_{12}$. When a current of 10 units is applied to the circuit with both paths superconductive, 6 units of current are directed into path 12 and 4 units into path 14. Cryotron gate 20*g* is then driven resistive to shift all of this current into path 14. This gate is then allowed to again become superconductive and the applied current of 10 units is terminated to store a persistent current in loop 10. The magnitude of the stored current here designated $I_{S1}$ is, as before, given by the equation $$I_{S1}=I_A\frac{L_{14}}{L_{12}+L_{14}}$$

and is equal to 6 units in a clockwise direction. This value is plotted as $I_{S1}$ in FIG. 2. The net currents in control conductor 22*c* for various magnitudes of currents subsequently applied at terminal 16 are set forth in tabular form below, it being noted that such currents divide between paths 12 and 14 inversely in proportion to the inductances of these paths, that is, $\frac{6}{10}$ of the current at terminal 16 is directed into path 12 and $\frac{4}{10}$ into path 14.

| I stored | I applied at terminal 16 | I net in control conductor 22c |
|---|---|---|
| −6 | +6 | −2.4 |
| −6 | +8 | −1.2 |
| −6 | +9 | −0.6 |
| −6 | +9⅙ | −0.5 |
| −6 | +10 | 0 |
| −6 | +10⅚ | +0.5 |
| −6 | +11 | +0.6 |

From the above table it is apparent that the gate 22g of cryotron 22 is resistive unless the applied current is between 9⅙ units and 10⅚ units. Thus, a comparison is indicated when the current applied at terminal 16 is within 8⅓% of the originally applied current of 10 units. This is an improvement in sensitivity over that for the circuit when the inductances $L_{12}$ and $L_{14}$ are equal, in which case, a comparison is indicated when the applied current is within 10% of the originally applied current. The sensitivity becomes sharper as the ratio $L_{12}/L_{16}$ is increased. For example, if this ratio equals 10, and 10 units of current are initially applied and the circuit operated as described above, 9 units of current are stored in loop 10. Outputs indicating a comparison are realized for subsequently applied currents having a magnitude within 5.6% of the originally applied 10 units of current.

Regardless of the ratio of the inductances of the two parallel paths, the sensitivity of the circuit of FIG. 1 may be increased by increasing the value of the current supplied by source 42 to gate 22g. As stated above, the curve of FIG. 2 shows the characteristic of cryotron 22 in the absence of the current in the gate 22g. Where the gate current is very small the characteristic shown is a relatively accurate indication of the actual response of the cryotron. However, as the current in the gate is increased, the field produced by this current also increases. For wire wound cryotrons of the type shown in FIG. 1 and thin film cryotrons of the type shown in copending application Serial No. 625,512, cited above, the gate field and control field are at right angles. As a result, the gate field, or more specifically, a component of the gate field adds to the control field regardless of the direction of the control field. Thus, the field produced by the current in gate 22g actually narrows the superconductive portion of the characteristic of the cryotron 22 as shown in FIG. 1. For example, if the current applied to the gate is just below that which is effective, of and by itself, to cause the gate to be driven resistive, then a very small net current in either direction in the control conductor 22c is effective to drive the gate resistive, thereby providing extremely sensitive response which is independent of the relative directions of the gate and control currents.

The sensitivity of the circuit may also be increased, as stated above, by increasing the sensitivity of the cryotron 22. This may be accomplished by designing the control conductor to produce a magnetic field of greater intensity per unit of current. For wire wound cryotrons, this is done by increasing the number of times per unit of length of the control coil, and, for thin film cryotrons, the same result is achieved by making the control conductor extremely narrow.

Particular note should be made of the fact that the circuit of FIG. 1 may be used to compare on values of current different from the 10 units used in the examples given above. The operation of the circuit is the same for initially applied currents of greater or lesser magnitude than 10 units. Further, where a current to be compared is applied to terminal 16 after a current has been stored, gate 22g is always driven resistive when the subsequently applied current is in a different direction than the current originally applied to set up the stored current in loop 10. It should also be recognized that in circuits of the type shown in FIGS. 3 and 3A wherein biasing fields are applied to one or more of the output cryotrons, these biasing fields may be produced by persistent current established in loops in which the bias control conductors are connected.

FIG. 3 shows a circuit of the general type shown in FIG. 1 with the added feature that distinct current outputs are produced to indicate whether an applied signal is less than, equal to, or greater than a signal value represented by a current stored in a superconductive loop. In FIG. 3 the superconductor storage loop is designated 50 and includes two parallel paths 52 and 54 extending between a pair of terminals 56 and 58. Path 52 includes the gate 60g of an input cryotron 60, the control coil 62c of an "equal" output cryotron 62, the control coil 64c of a "low" output cryotron 64, and the control coil 66c of a "high" output cryotron 66. These latter three cryotrons control the production of outputs indicative if either an applied signal is high, low, or equal, as compared to the value of a signal represented by a current stored in loop 50. Path 54 includes an inductance 54a and, in order to simplify the explanation of the principles of operation of the circuit, the inductance $L_{54}$ of the path 52 is equal to the inductance $L_{52}$ of path 54. Current is stored in loop 50 by operating a switch 70 to allow current source 72 to apply a current at terminal 56; energizing control conductor 60c to cause the current to be directed entirely into path 54; deenergizing the control conductor and then opening switch 70. Assuming that the applied current has a magnitude of 10 units, 5 units of current in a clockwise direction are stored in loop 54a. A switch 74 is then closed to allow a current source 76 to apply current signals to terminal 56. The current source 76 supplies a current which may vary between 0 and 20 units.

The output current for the circuit of FIG. 2 is supplied by a source 80 under control of a switch 81 with which the gates 62g, 64g, and 66g of the three output cryotrons are connected in parallel. Output cryotron 62 is provided with a single control conductor 62c which is connected in path 52. Output cryotrons 64 and 66 are provided with both the control conductors 64c and 66c, which are connected in path 52, and bias conductors 64b and 66b. Bias conductors 64b and 66b receive bias current from a bias current source 82. The bias current circuit is shown in heavy lines to distinguish the bias conductors 64b and 66b from the control conductors 64c and 66c.

The characteristics of the cryotrons 62, 64, and 66 are plotted in FIGS. 4A, 4B, and 4C, respectively. The characteristic for cryotron 62 is the same as that for cryotron 22 of FIG. 1 which is plotted in FIG. 2, and different from the characteristics for cryotrons 64 and 66. Cryotrons 64 and 66 have the same characteristics and, as is indicated in these figures, each of these cryotrons requires a larger net current, considering the current in the bias and control conductors as a whole, to drive them resistive than is required by cryotron 62. The bias and control conductors for cryotrons 64 and 66 are fabricated so that a unit of current in either applies the same intensity of magnetic field to the associated gate. These bias and control conductors are arranged so that their fields combine to control the states of the associated gate conductors. Thus, for example, if bias conductor 64b is carrying 1 unit of current in one direction and control conductor 64c is similarly carrying 1 unit of current in the same direction, the effect on the gate 64g is the same as if both units of current were flowing in one of these conductors and no current in the other. Where the bias conductor 64b and control conductor 64c are each carrying 1 unit of current, but the currents are in opposite directions, the effect is the same as if there was no current in either conductor. Thus, in FIGS. 4B and 4C, the characteristics of cryotrons 64 and 66 are plotted in terms of the algebraic sum of the control and bias conductor circuits for these cryotrons. Each of the cryotrons 64 and 66 remains in a superconductive state as long as this combined bias and control current does not exceed 2.5 current units.

Referring again to FIG. 3, the bias conductor 64b is wound on gate 64g in a different sense than the bias conductor 66b is wound on gate 66g. In terms of the positive and negative convention adapted above, the bias current from source 82 in bias conductor 64b is considered positive since it produces a magnetic field in a direction opposite to that produced by the minus 5 units of stored current flowing in control conductor 64c. Conversely, the bias current in the bias conductor 66b is negative since its field adds to that of the stored current flowing in control conductor 66c. The magnitude of the bias current supplied to bias conductors 64b and 66b by source 80 is 2.6 units. The values and directions of the individual currents in the bias and control conductors of cryotrons 64 and 66 are shown in FIGS. 4B and 4C. In FIG. 4B, the stored current of 5 units in a negative direction in control conductor 64*c* and the bias current of 2.6 units in a positive direction in bias conductor 64*c* are represented vectorially to show that, under these conditions, the net current is 2.4 units and the gate 64*g* of cryotron 64 is, therefore, superconductive. A similar representation of the currents applied to the bias and control conductors 66*b* and 66*c* is shown in FIG. 4C but, here, since both currents are negative, the net current is 7.6 units and the gate 66*g* is resistive. As is indicated in FIG. 4A, gate 62*g* of cryotron 62 is subjected to the field produced by the −5 units of stored current in control conductor 62*c* and this gate is, therefore, superconductive. If, under these conditions, that is, with a current of 5 units in a clockwise direction stored in loop 50, and no current applied at terminal 56, switch 81 is operated to initiate a comparison operation, the entire current from source 80 is directed through gate 64*g* since both of the other output gates 62*g* and 66*g* are resistive. A current output is produced on line 90L indicating that the magnitude of the applied pulse, here zero, is lower than the 10 units represented by the stored current in loop 50.

Each of the three output lines 90E, 90H, and 90L is connected through further superconductive circuitry to a superconductive ground so that the manner in which the current from source 80 divides between these lines is controlled by the states of the gates 62*g*, 64*g*, and 66*g*, and also a further pair of gates 94*g* and 96*g* which are connected in series with gates 64*g* and 66*g*, respectively. The control conductors 94*c* and 96*c* for these gates are connected in series with gate 62*g* and the function of the cryotrons 94 and 96 is to ensure that, during each comparison operation, the current from the source 80 is directed entirely to one of the three output lines 90E, 90H, and 90L. For the operation above described, gate 62*g* is resistive and no current is directed through control conductors 94*c* and 96*c*, so that the gates of cryotrons 94 and 96 remain superconductive and do not interfere with the direction of the output signal to output line 90L. The net currents in the control conductor of cryotron 62 and the combined currents in the bias and control conductors of cryotrons 64 and 66 for various values of current applied at terminal 56 are shown below in tabular form.

| I stored | I applied | $I_{62c}$ | $I_{64b}+I_{64c}$ | $I_{66b}+I_{66c}$ |
|---|---|---|---|---|
| −5 | 0 | −5 | −2.4 | −7.6 |
| −5 | 2 | −4 | −1.4 | −6.6 |
| −5 | 4 | −3 | −0.4 | −5.6 |
| −5 | 6 | −2 | +0.6 | −4.6 |
| −5 | 8 | −1 | +1.6 | −3.6 |
| −5 | 9 | −0.5 | +2.1 | −3.1 |
| −5 | 9.8 | −0.5 | +2.5 | −2.7 |
| −5 | 10 | 0 | +2.6 | −2.6 |
| −5 | 10.2 | +0.1 | +2.7 | −2.5 |
| −5 | 11 | +0.5 | +3.1 | −2.1 |
| −5 | 12 | +1 | +3.6 | −1.6 |
| −5 | 14 | +2 | +4.6 | −0.6 |
| −5 | 16 | +3 | +5.6 | +0.4 |
| −5 | 18 | +4 | +6.6 | +1.4 |
| −5 | 20 | +5 | +7.6 | +2.4 |

From the table it can be seen that when the applied current is between 0 and 9.8 units, the net combined current $I_{64b}+I_{64c}$ is less than 2.5 units and gate 64*g* is, therefore, superconductive; when the applied current is between 10.2 and 20 units, the net combined current $I_{66b}+I_{66c}$ is less than 2.5 units and gate 66*g* is superconductive; and, when the applied current is between 9 and 11 units, the net current $I_{62c}$ is less than 0.5 unit and gate 62*g* is superconductive.

Thus, for applied currents between 0 and 9 units, only gate 64*g* is superconductive and sensing current from source 80 is directed to the low output line 90L.

When the applied current is between 9 units and 9.8 units, both gates 62*g* and 64*g* are superconductive and a current pulse from source 80 splits between these two gates. However, the portion of the current directed through gate 62*g* also passes through control conductor 94*c* of cryoton 94 to drive gate 94*g* resistive. This gate is connected in series with gate 64*g* and, when driven resistive in this manner, causes the entire current applied by source 80 to be directed through gate 62*g* and an output is manifested on equal output line 90E.

When the applied current is between 9.8 units and 10.2 units only output gate 62*g* is superconductive and a current applied to the output current by operating switch 81 is directed through the gate to equal output line 90E.

When the applied current is between 10.2 units and 11 units, both gates 62*g* and 66*g* are superconductive. When the switch 81 is operated under these conditions, the current initially splits between these two gates with the current through gate 62*g* also passing through the control conductor 96*c* of cryotron 96. Gate 96*g* is driven resistive, causing the entire sensing current to flow through gate 62*g* to equal output line 90E.

Finally, when the applied current is between 11 units and 20 units, only gate 66*g* is superconductive and the sensing current from source 80 is directed to "high" output line 90H.

Thus, it can be seen that a comparison is indicated by the presence of an output on line 90E during a sensing operation when the applied current is between 9 and 11 units, that is, within 10% of the 10 units represented by the stored current of 5 units in loop 50. For applied current less than 9 units, a low indication is provided on line 90L and, for currents greater than 11 units, a high indication is provided at line 90L.

The sensitivity of the device may be changed, as above described, by designing the circuit so that the ratio of the inductance $L_{54}$ of path 54 to the inductance $L_{52}$ of path 52 is higher. The sensitivity may also be changed by changing the output circuit as shown in FIG. 3A. In the output circuit shown in this figure, the connections to the control and gate conductor of cryotrons 94 and 96 are reversed so that the gates of these cryotrons are connected in series with gate 62*g* and the control conductors in series with gates 64*g* and 66*g*, respectively. As a result, when gate 62*g* and one of the other output gates are in a superconductive state (e.g. for an applied current between 9 units and 9.8 units) the sensing current from source 80, after an initial split, is directed to the high or low output lines 90H or 90L, as the case may be, instead of to the equal output line 90E. For this type of connection, an equal output indication is provided only when the applied current is between 9.8 units and 10.2 units. For applied currents less than 9.8 units, a low output indication is realized and, for applied currents greater than 10.2 units, a high output indication is realized.

An important point to note concerning the circuit of FIGS. 3 and 3A is that the circuit may be used to store current signals representing currents less than 10 units and obtain equal, high, and low indications by operating switch 81 after a current to be compared has been applied to terminal 56. The range of applied currents for which distinct signal outputs on only one of the output lines 90E, 90H, and 90L are realized, decreases as the magnitude of the stored current is decreased. Thus, for a stored current of 4 units, representing a current of 8 units, the range for which distinct outputs are realized on only one of the lines 90E, 90H, and 90L, extends from 0 to 18 units, since, for applied currents greater than 18 units, all three output gates are resistive; for a stored current of 3 units, the range extends from 0 to 16 units; etc.

A further feature of the circuit of FIGS. 3 and 3A is that the bias current applied to bias conductors 64*b* and 66*b* do not induce any current in loop 50 even though both of these conductors are inductively coupled to the loop.

This is due to the fact that these conductors, which carry the same bias current, are coupled to the loop in opposite senses.

Another important feature to note concerning the circuits of FIGS. 1, 3, and 3A is that the originally applied current which sets up the stored current in the superconductive loop need not be the known current. Any current may be stored and its magnitude later determined by subsequently applying currents of known magnitude to the current input terminal for the loop.

FIG. 5 is a schematic representation of an analog to digital converter. This circuit includes ten persistent current loops, 100, 110, 120, 130, 140, 150, 160, 170, 180, and 190, each including two parallel paths 102, 104, 112, 114, 122, 124, 132, 134, 142, 144, 152, 154, 162, 164, 172, 174, 182, 184, 192, and 194. Each of the loops is constructed in the same way as the loop 10 of FIG. 1. Taking loop 100 as an example, the two parallel paths 102 and 104 of the loop extend between a pair of terminals 106 and 108. Path 102 includes the gate conductor 107*g* of a control or input cryotron 107 and the control conductor 109*c* of an output cryotron 109. The characteristic for each of the output cryotrons 109, 119, 129, 139, 149, 159, 169, 179, 189, and 199 is shown by the heavy line curve of FIG. 6. Each of these cryotrons requires a current of just in excess of ½ a unit in its control conductor for its gate conductor to be driven resistive.

In order to condition the circuit for operation, different values of persistent current are established in the superconductor loops. Specifically, persistent currents having magnitudes of 0, 1, 2, 3, 4, 5, 6, 7, 8, and 9 units are established in loops 100, 110, 120, 130, 140, 150, 160, 170, 180, and 190 respectively. This is accomplished by a current source 200 and a switch 202, under control of the loop input cryotrons 107, 117, 127, 137, 147, 157, 167, 177, 187, and 197. The loops are connected in series so that, when switch 202 is operated, the current from source 200 is applied to the input terminals 106, 116, 126, 136, 146, 156, 166, 176, 186, and 196 of each loop and divides equally between the two parallel paths (e.g. 102 and 104) of equal inductance which form the loop. When switch 202 is operated, source 200 supplies a current which increases by increments of 2 units as shown in FIG. 7. While the current is at a level of 2 units, the control conductor of cryotron 117 of loop 110 is energized to cause the 2 units of current to be directed entirely to path 114 of this loop. This is accomplished and the control conductor is deenergized before the current from source 200 is stepped to 4 units. At this time, the control conductor of cryotron 127 is energized so that the 4 units of current are directed into path 124 of loop 120 after which this control conductor is deenergized. Since the gate of cryotron 117 is superconductive when the current from source 200 is increased from 2 to 4 units, the increased current splits evenly between the now completely superconductive paths 112 and 114 so that there are now 3 units of current in path 114 and 1 unit of current in path 112. When the current from source 200 is increased to 6 units, input cryotron 137 of loop 130 is similarly operated so that 6 units of current are directed into path 134 of this loop. The increased current from source 200 divides evenly in all of the other loops since they are entirely superconductive. This operation is repeated for each of the successive loops as the current from source 200 is stepped to 18 units. After completion of the shifting of 18 units of current to path 194 of loop 190, switch 202 is opened to terminate the supply current. This causes persistent currents to be established in each of the loops, the magnitude of the stored current depending on the difference between the current magnitudes in the parallel paths forming the loop at the time the supply current is terminated. The magnitudes of the current in the various parallel paths prior to opening switch 202 and the magnitude of the current stored in each loop when this switch is opened to terminate supply current are shown in tabular form below.

| Loop | Current in Parallel Paths Prior to Termination of Supply Current | | Current stored |
|---|---|---|---|
| | Left hand paths (102–192) | Right hand paths (104–194) | |
| 100 | 9 | 9 | 0 |
| 110 | 8 | 10 | 1 |
| 120 | 7 | 11 | 2 |
| 130 | 6 | 12 | 3 |
| 140 | 5 | 13 | 4 |
| 150 | 4 | 14 | 5 |
| 160 | 3 | 15 | 6 |
| 170 | 2 | 16 | 7 |
| 180 | 1 | 17 | 8 |
| 190 | 0 | 18 | 9 |

The same result, that is, the establishing of successively greater persistent current in the loops 100, 110, etc., can be accomplished by energizing the control conductors for each of the control cryotrons, with the exception of control cryotron 107, prior to operating switch 202. The control conductors for these cryotrons are then deenergized in succession as the supply current from source 200 is stepped up. When the supply current is terminated, persistent currents of the same magnitudes as shown in the table above are established in the loops.

With the circuit conditioned for operation, a switch 204 is closed to allow an analog current source 206 to supply current to the series connected loops. The magnitudes of currents stored in these loops are indicated by the vertical dotted lines in FIG. 6. From this plot it can be seen that for each value of applied current between −1 and +19 currents, remembering that current applied to each loop by source 206 splits evenly between the paths forming the loops, the gate of at least one of the output cryotrons 109, 119, 129, 139, 149, 159, 169, 179, 189, and 199 is superconductive. These output gates are connected in parallel with an output current source 220 which supplies current when a switch 219 is closed. The current from this source is directed through the superconductive gate to the appropriate one of the digital output lines 220–0 through 220–9. These lines are connected through further superconductor circuitry to a superconductive ground terminal.

Since each of the output cryotrons requires a net current slightly in excess of 0.5 unit in its control conductor to cause its gate to be driven resistive, for certain values of applied current, two of the output gates are superconductive. Specifically, for applied currents of exactly 1, 3, 5, 7, 9, 11, 13, 15 and 17 units, the output gates for two successive loops are superconductive. In order to ensure that the entire current is directed to only one of the digital output lines, cryotrons 221 through 229 are connected in the output circuit. Each of these cryotrons has its gate connected in one of the digital output paths and its control conductor connected in the preceding digital output path so that, when two output gates are rendered superconductive in response to an input from the analog supply source 206, the current from source 220 is directed through the lower value digital output path. An important thing to note about the circuit of FIG. 5 is that it is electrically conditioned to perform the particular analog to digital operation described. The same structure may be electrically conditioned to perform different functional operations. For example, the input current initially applied to set up the currents in the various loops need not increase in linear steps as shown in FIG. 7 but the step increases may be logarithmic. In such a case, the inputs applied to the circuit after the persistent currents have been stored produce outputs on the lines 220–0 through 220–9 indicative of the digital values corresponding to logarithms represented by the magnitudes of the input currents.

While the invention has been particularly shown and described with reference to preferred embodiments thereof, it will be understood by those skilled in the art that various changes in form and details may be made therein without departing from the spirit and scope of the invention.

What is claimed is:

1. A superconductor circuit comprising; a loop of superconductor material formed of first and second superconductive current paths extending between first and second terminals for the loop; current supply means connected to said loop effective to apply a first current to one of said terminals for said loop; means for introducing resistance into said first current path of said loop to cause said first current from said supply means to be directed into said second path and then allowing said first path to again become entirely superconductive; said current supply means terminating said first current when said loop is entirely superconductive to cause to be stored in said loop a persistent current representative of said first current; said current supply means being thereafter effective to apply a second current to one of said terminals for said loop; said second current dividing between said paths with the portion thereof in said first path being in the opposite direction to the persistent current in that path and the portion thereof in said second path being in the same direction as the persistent current in that path; a plurality of output cryotrons each including a superconductor gate conductor and a superconductor control conductor arranged in magnetic field applying relationship to the gate conductor; each of said control conductors being connected in one of the paths of said loop and carrying both the persistent current stored in said loop and the portion of the second current flowing in the path in which it is connected; and an output circuit in which the gates of said output cryotrons are connected in parallel for providing distinct current outputs indicative of the relationship between said first applied current and said second applied current.

2. The circuit of claim 1 wherein the current required in the control conductor of one of said plurality of cryotrons to cause the gate conductor thereof to be driven resistive is greater than the current required in the control conductor of another one of said cryotrons to cause the gate conductor thereof to be driven resistive.

3. The circuit of claim 1 wherein said plurality of output cryotrons includes first, second, and third output cryotrons each of which has its control conductor connected in said second path, and bias conductor means are provided for each of said second and third cryotrons for applying a biasing magnetic field in one direction to the gate conductor of said second cryotron and a biasing magnetic field in an opposite direction to the gate conductors of said third cryotron.

4. The circuit of claim 3 wherein the gate conductors of said first, second, and third output cryotrons are connected in parallel in said output circuit and current applied to these parallel connected gate conductors is directed through either said first, said second, or said third gate conductor according to whether said second applied current is equal to, greater than, or less than said first applied current.

5. A superconductor circuit comprising; a loop of superconductor material; said loop storing a persistent current representative of a current value; means for applying a current to said loop; an output cryotron including a superconductor gate conductor and a superconductor control conductor arranged in magnetic field applying relationship to the gate conductor for indicating the relationship of the value of the applied current to the value of the current represented by the persistent current stored in said loop; said control conductor being connected in said loop to carry both said persistent current and at least a portion of said applied current; said persistent current and said portion of said applied current flowing in different directions in said control conductor; and bias conductor means for applying a biasing magnetic field to said gate conductor; whereby said gate conductor is in its superconductive state when the applied current is greater than the current value represented by the persistent current stored in said loop and is in a resistive state when the applied current is equal to or less than the current value represented by the persistent current stored in said loop.

6. A superconductor circuit comprising; a loop of superconductor material; said loop storing a persistent current representative of a current value; means for applying a current to said loop; an output cryotron including a superconductor gate conductor and a superconductor control conductor arranged in magnetic field applying relationship to the gate conductor for indicating the relationship of the value of the applied current to the value of the current represented by the persistent current stored in said loop; said control conductor being connected in said loop to carry both said persistent current and at least a portion of said applied current; said persistent current and said portion of said applied current flowing in different directions in said control conductor; and bias conductor means applying a biasing magnetic field to said gate conductor; whereby said gate conductor is in its superconductive state when the applied current is less than the current value represented by the persistent current stored in said loop, and is in a resistive state when the applied current is either equal to or greater than said current value represented by the persistent current stored in said loop.

7. A superconductor circuit comprising; a loop of superconductor material; said loop storing a persistent current representative of a current value; means for applying a signal to said loop to compare the value of the applied signal to the current value represented by the current stored in said loop; high, low, and equal output cryotrons each comprising a gate conductor and a control conductor arranged in magnetic field applying relationship to the gate conductor; the control conductors of each of said high, low, and equal output cryotrons being connected in said loop and carrying both the persistent current stored in said loop and at least a portion of the current signal applied to said loop; bias control conductor means for applying biasing magnetic fields in opposite directions to the gate conductors of said high and low output cryotrons; whereby the gates of said high, low, and equal cryotrons are controlled between superconductive and resistive states in accordance with whether the value of the applied signal is greater than, less than, or equal to the current value represented by the current stored in said loop; and an output circuit; said gate conductors of said first, second, and third cryotrons being connected in parallel in said output circuit whereby current applied to said output circuit is directed through either said first, said second, or said third gate conductor in accordance with whether the applied signal is greater than, less than, or equal to the current value represented by the current stored in said loop.

8. In a superconductor circuit; a loop of superconductor material; said loop storing a persistent current; said persistent current representing a particular current value; means for applying a current signal to said loop; first, second, and third output cryotrons each comprising a gate conductor and a control conductor arranged in magnetic field applying relationship to the gate conductor; each of said control conductors being connected in said loop and carrying both said persistent current and at least a portion of said applied current; the characteristics of each of said cryotrons being such that each of said output gate conductors is controlled between superconductive and resistive states when said current is applied to said loop to indicate a different relationship between the value of the applied current and the current value represented by the persistent current stored in said loop.

9. In a superconductor circuit; a loop of superconductor material; said loop storing a persistent current; means for applying a current signal to said loop; a plurality of output cryotrons each comprising a gate conductor and a control conductor arranged in magnetic field applying relationship to the gate conductor; each of said control conductors being connected in said loop and carrying said persistent current and at least a portion of said applied current; the persistent current and the portion of the applied current in at least one of said control conductors flowing in opposite directions; whereby said output gate conductors are controlled between superconductive and resistive states when said current is applied to said loop in accordance with the magnitude of the applied current with each gate conductor being superconductive for different magnitudes of applied current.

10. The circuit of claim 9 wherein there are at least three of said output cryotrons and two of these output cryotrons are provided with biasing magnetic fields which control the gate conductors of these cryotrons to be superconductive for different magnitudes of applied current.

11. The circuit of claim 9 wherein said loop comprises two parallel paths extending between first and second current terminals for the loop and said current signals are applied to one of said terminals; the inductance of said second path being appreciably greater than the inductance of said first path.

12. The circuit of claim 11 wherein said cryotron control conductors are each connected in said first path and the portion of said applied current which flows in said first path is in a direction opposite to the direction of the persistent current flowing in that path.

13. The circuit of claim 12 wherein said gate conductors of said output cryotrons are connected in parallel circuit relationship with respect to a terminal to which output current signals for said circuit are applied.

14. A superconductor circuit comprising a loop of superconductor material formed of first and second current paths extending in parallel between first and second terminals for the loop, current supply means coupled to said loop for causing a selected amount of persistent current representative of a first current to be stored in said loop, means for applying a second current to one of said terminals of said loop to cause at least a portion of this current to flow in said first path and the remaining portion in said second path of said loop, said applied current flowing in the same direction as said stored persistent current in said second path and in an opposite direction to said stored current in said first path, an output cryotron for said loop including a superconductor gate conductor and a superconductor control conductor arranged in magnetic field applying relationship to said gate conductor, said control conductor being connected in said first path of said loop so that the net current in said control conductor is equal to the difference between said persistent current and the portion of said applied current in said first path whereby said gate conductor is in a superconductive state when said applied second current compares with said first current represented by the current stored in said loop and is in a resistive state when said applied second current is either greater than or less than said first current represented by the persistent current stored in said loop, and at least one further cryotron having a superconductor gate conductor and superconductor control and bias conductors arranged in magnetic field applying relationship to said gate conductor, said bias conductor carrying a bias current, and said control conductor of said further cryotron being connected in one of said paths of said loop and carrying both the persistent current and the portion of the applied current in that path.

References Cited by the Examiner

UNITED STATES PATENTS

| | | | |
|---|---|---|---|
| 2,913,881 | 11/59 | Garwin | 340—183.1 |
| 3,019,354 | 1/62 | Anderson et al. | 340—173.1 |
| 3,082,408 | 3/63 | Garwin | 340—173.1 |

OTHER REFERENCES

Publication I: Cryogenic Devices in Logical Circuitry and Storage, J. W. Bremer, Electrical Manufacturing, February 1958, pp. 78–83.

Publication II: The Persistatron: A Superconducting Memory and Switching Element for Computers, M. J. Buckingham, Low Temperature Physics and Chemistry Conference held Aug. 26–31, 1957, Nov. 3, 1958, pp. 229–232.

IRVING L. SRAGOW, *Primary Examiner.*